United States Patent [19]
Skrbina et al.

[11] Patent Number: 5,506,777
[45] Date of Patent: Apr. 9, 1996

[54] ELECTRONIC ENGINE CONTROLLER WITH AUTOMATIC HARDWARE INITIATED A/D CONVERSION OF CRITICAL ENGINE CONTROL PARAMETERS

[75] Inventors: John R. Skrbina, Livonia; Paul C. Mingo, Farmington Hills, both of Mich.; Pavel Pesek, Carol Stream, Ill.

[73] Assignee: Ford Motor Company, Dearborn, Mich.

[21] Appl. No.: 363,070

[22] Filed: Dec. 23, 1994

[51] Int. Cl.$^6$ .............................. H03M 1/12; G06F 3/00
[52] U.S. Cl. .............................. 364/431.04; 364/431.12; 341/155; 341/141
[58] Field of Search .................. 364/431.01, 431.03, 364/431.04, 431.05, 431.06, 431.11, 431.12; 123/478, 479, 480; 341/118, 121, 126, 134, 155, 165

[56] References Cited

U.S. PATENT DOCUMENTS

| | | | |
|---|---|---|---|
| 4,100,891 | 7/1978 | Williams | 123/487 |
| 4,234,921 | 11/1980 | Kinoshita et al. | 364/431.01 |
| 4,255,789 | 3/1981 | Hartford et al. | 364/431.06 |
| 4,264,898 | 4/1981 | Barman et al. | 341/141 |
| 4,621,335 | 11/1986 | Bluish et al. | 364/550 |
| 4,907,176 | 3/1990 | Bahnick et al. | 364/551.01 |
| 4,964,051 | 10/1990 | Sekozawa et al. | 364/431.04 |
| 4,989,150 | 1/1991 | Tazawa | 364/431.03 |
| 5,038,287 | 8/1991 | Taniguchi et al. | 364/424.1 |
| 5,081,454 | 1/1992 | Campbell, Jr. et al. | 341/141 |
| 5,166,685 | 11/1992 | Campbell, Jr. et al. | 341/141 |
| 5,168,276 | 12/1992 | Huston et al. | 341/141 |
| 5,184,302 | 2/1993 | Ishida et al. | 364/431.11 |
| 5,291,197 | 3/1994 | Abe | 341/141 |
| 5,293,167 | 3/1994 | Campbell, Jr. et al. | 341/141 |
| 5,302,952 | 4/1994 | Campbell, Jr. et al. | 341/155 |
| 5,339,245 | 8/1994 | Hirata et al. | 364/431.08 |

*Primary Examiner*—Kevin J. Teska
*Assistant Examiner*—Tan Q. Nguyen
*Attorney, Agent, or Firm*—Peter Abolins; Roger L. May

[57] ABSTRACT

An electronic engine controller includes a central processing unit (CPU) which controls the operations of the controller and an analog-to-digital (A/D)converter chip which receives analog signals generated by sensors which transmit signals indicative of vehicle and engine operating parameters. The A/D converter chip automatically performs a conversion on certain signals indicative of critical engine operating parameters to generate corresponding digital values upon each engine revolution. These digital values are stored for retrieval by the CPU. Digital values corresponding to other signals are generated and transmitted upon request by the CPU. The A/D converter chip and the CPU are coupled by a serial link which operates under one of several protocols to transmit digital values from the A/D converter chip to the CPU.

9 Claims, 6 Drawing Sheets

5,506,777

ELECTRONIC ENGINE CONTROLLER WITH AUTOMATIC HARDWARE INITIATED A/D CONVERSION OF CRITICAL ENGINE CONTROL PARAMETERS

FIELD OF THE INVENTION

This invention relates to the field of electronic engine control and more particularly to the use of analog-to-digital converters by electronic engine controllers.

BACKGROUND OF THE INVENTION

Electronic engine controllers are increasingly being used to control various operating parameters of modern vehicle engines. Electronic engine controllers receive a plurality of input signals, each of which is indicative of a different aspect of engine operation, such as exhaust gas composition, engine speed or intake aircharge. The input signals are then processed, under stored program control, to generate control signals to control various operating parameters of the engine such as air/fuel mixture and spark timing.

The input signals received by the controller are often in analog form and must first be converted into digital form in order to be useable by the controller. Typically analog-to-digital (A/D) conversion is performed by specialized circuitry which performs a conversion upon request by the controller. The controller, operating under stored program control, requires a particular digital value, and requests conversion of information received on a corresponding analog signal into a digital value. The controller then waits for the conversion and proceeds upon completion of the A/D conversion.

Unfortunately, in the method described above, the time required for the controller to request initiation of a conversion, and then to wait for conversion of a needed signal, reduces the ability of the controller to perform engine control functions. Rather than performing a needed engine control or diagnostic function, the controller must first request a conversion, and then either wait for the requested ATD conversion of a needed value, or must switch to another task while the A/D conversion takes place. Both of these options reduces the efficiency with which the controller can perform its required tasks. The problem is compounded by the increasingly stringent regulated emissions requirements which have increased the number of input signals which the controller must utilize in performing engine control.

Thus, although electronic controllers have become increasingly powerful, the engine control demands placed upon the controllers by increasingly sophisticated engines and increasingly stringent emissions requirements place an increasingly heavy demand on the controller. As a result, there is a need for an engine controller which performs analog-to-digital conversion of input signals in an efficient manner to reduce the chronometric load on the controller and to thus allow the controller to meet the increasingly heavy processing demands placed upon modern engine controllers.

SUMMARY OF THE INVENTION

It is an object of the present invention to increase the ability of an electronic engine controller to perform engine control functions by reducing the amount of time required by the engine controller to receive one more desired digital input values.

In accordance with the primary object of the invention, in a preferred embodiment, an electronic engine controller includes a primary control module which operates under stored program control to generate, as a function of a plurality of digital input values, each of which is indicative of an operating condition of the engine, a plurality of control signals to control one or more operating parameters of the engine. The engine controller also includes an analog-to-digital (A/D) conversion means which is responsive to a periodically occurring engine event and to a plurality of input signals, for automatically performing an A/D conversion to generate a first of the plurality of digital input values as a function of a first of the input signals upon the occurrence of each engine event. The A/D conversion means stores the first digital input value for transmission to the primary control module upon request by the primary control module.

An advantage of certain preferred embodiments is that chronometric loading of the primary control module is reduced by automatically performing an A/D conversion on one or more critical input signals and transmitting the stored digital value upon request by the primary control module. The primary control module spends less time waiting for a required value and is thus better able to perform required engine control functions.

These and other features and advantages of the present invention may be better understood by considering the following detailed description of a preferred embodiment of the invention. In the course of this description, reference will frequently be made to the attached drawings.

DETAILED DESCRIPTION

Figure 1:
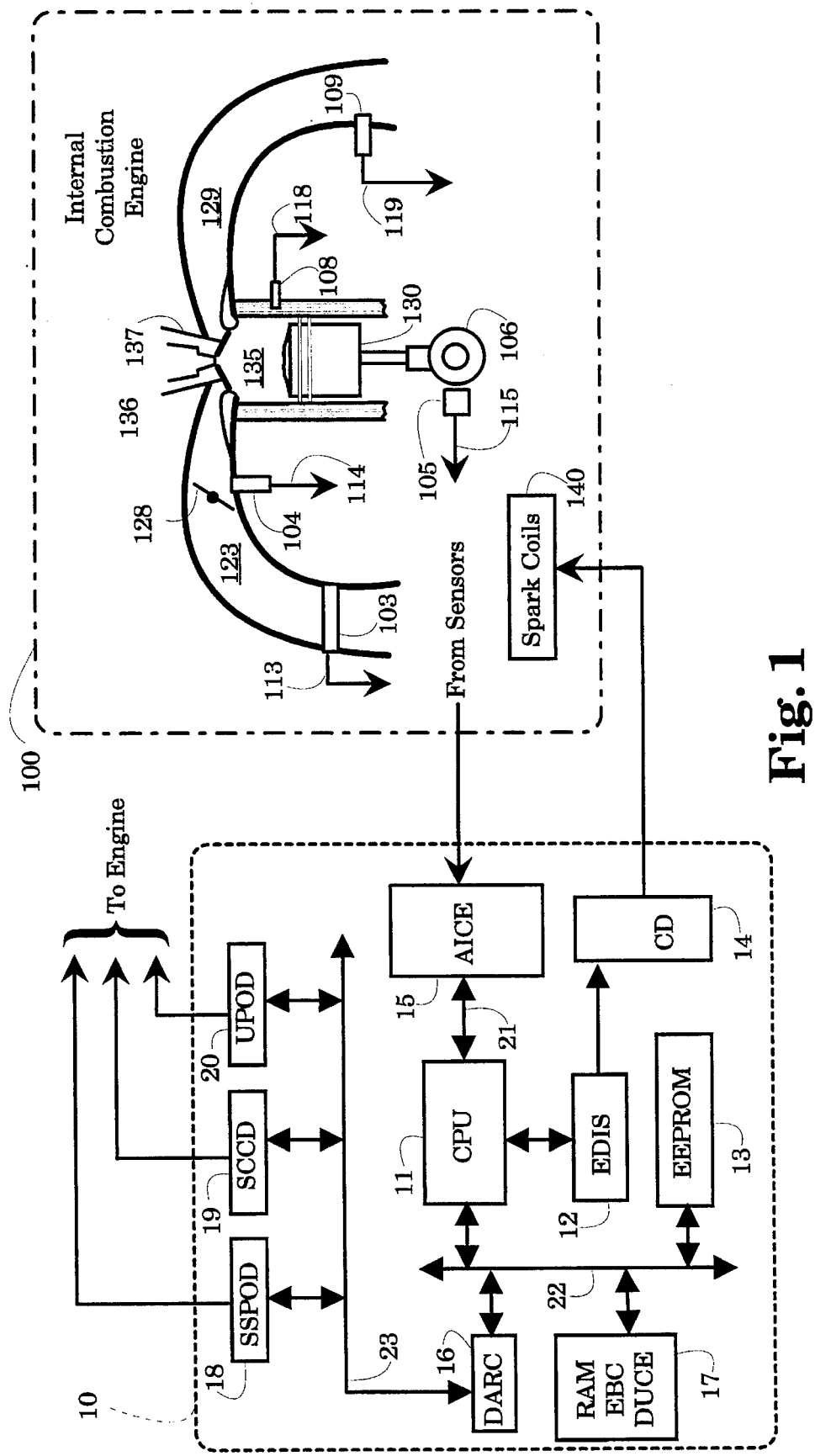
FIG. 1 of the drawings shows a block diagram of portions of an engine and an electronic engine controller which embody the principles of the invention.

FIG. 1 of the drawings shows an Electronic Engine Controller (EEC) 10 and an internal combustion engine 100. Engine 100 draws an aircharge through an intake manifold 123, past a throttle plate 128, and intake valve 136 and into combustion chamber 135. An air/fuel mixture which consists of the aircharge and fuel, is ignited in combustion chamber 135, and exhaust gas produced from combustion of the air/fuel mixture is transported past exhaust valve 137 through exhaust manifold 129. Piston 130 provides rotational power to crankshaft 106.

A crankshaft position sensor 105 detects the rotation of crankshaft 106 and transmits a crankshaft position signal 115 to EEC 10. Crankshaft position signal 115 preferably takes the form of a series of pulses, each pulse being caused by the rotation of a predetermined point on the crankshaft past sensor 105. The frequency of pulses on the crankshaft position signal 115 are thus indicative of the rotational speed of the engine crankshaft. A Mass Airflow (MAF) sensor 103 detects the mass flow rate of air into intake manifold 123 and transmits a representative signal 113 to EEC 10. MAF sensor 103 preferably takes the form of a hot wire amemometer. A throttle position sensor 104 detects the angular position of throttle plate 128 and transmits a representative signal 114 to EEC 10. Throttle position sensor 104 preferably takes the form of a potentiometer. An engine coolant temperature sensor 108 detects the temperature of engine coolant circulating within the engine and transmits a representative signal 118 to EEC 10. Engine coolant temperature sensor 108 preferably takes the form of a thermistor. A Heated Exhaust Gas Oxygen (HEGO) sensor 109, transmits a HEGO signal 119 which is indicative the amount of oxygen in the exhaust gas flowing through exhaust manifold 129.

EEC 10 includes a central processing unit (CPU) 11 which takes the form of an Intel 8065 micro-controller available from the Intel Corporation, Santa Clara, Calif. CPU 11 receives and transmits signal to and from an electronic distributorless ignition system (EDIS) chip 12 which provides spark timing signals to the coil drivers (CD) 14 which transmits signals to spark coils 140 to discharge spark plugs within the engine. EEC 10 includes RAM 17 for temporary data storage, an EEPROM 13 for storing control programs and a dual access RAM controller (DARC) 16 for controlling transfer of signals between output drivers 18, 19 and 20 and the CPU. DARC 16 also contains storage which may be used by the CPU. RAM 17 additionally includes a bus controller (EBC) and a duty cycle expander (DUCE) which provides additional pulse width modulation (PWM) capability. DARC 16 operates in response to commands from CPU 11 to transmit engine control signals generated by EEC 10 to engine 100 via output drivers seen at 18, 19 and 20. Preferably, EEC 10 includes six serial/parallel output drivers (SSPOD) which control low current outputs. EEC 10 preferably includes one switching constant current driver (SCCD) 19 which controls a pair of PWM outputs. Three Universal Power Output Drivers (UPOD) 20 transmit signals to various actuators in the engine.

EEC 10 also includes an analog input signal conditioning chip (AICE) 15 which receives analog signals generated by sensors in engine 100 and performs an analog-to-digital conversion (A/D) on the received signals to generate a corresponding digital value, and stores the digital values for transmission to CPU 11 upon request by the CPU. AICE 15 also contains circuitry which conditions certain analog signals and transmits the received analog signals in digital form. CPU 11 and AICE 15 communicate via signal lines 21 which operate according to a serial link addressing protocol (SLAP) to be described. As will be appreciated by those skilled in the art in view of the following description, AICE 15 advantageously improves the performance of EEC 10 by reducing the chronometric loading on CPU 11.

Figure 2:
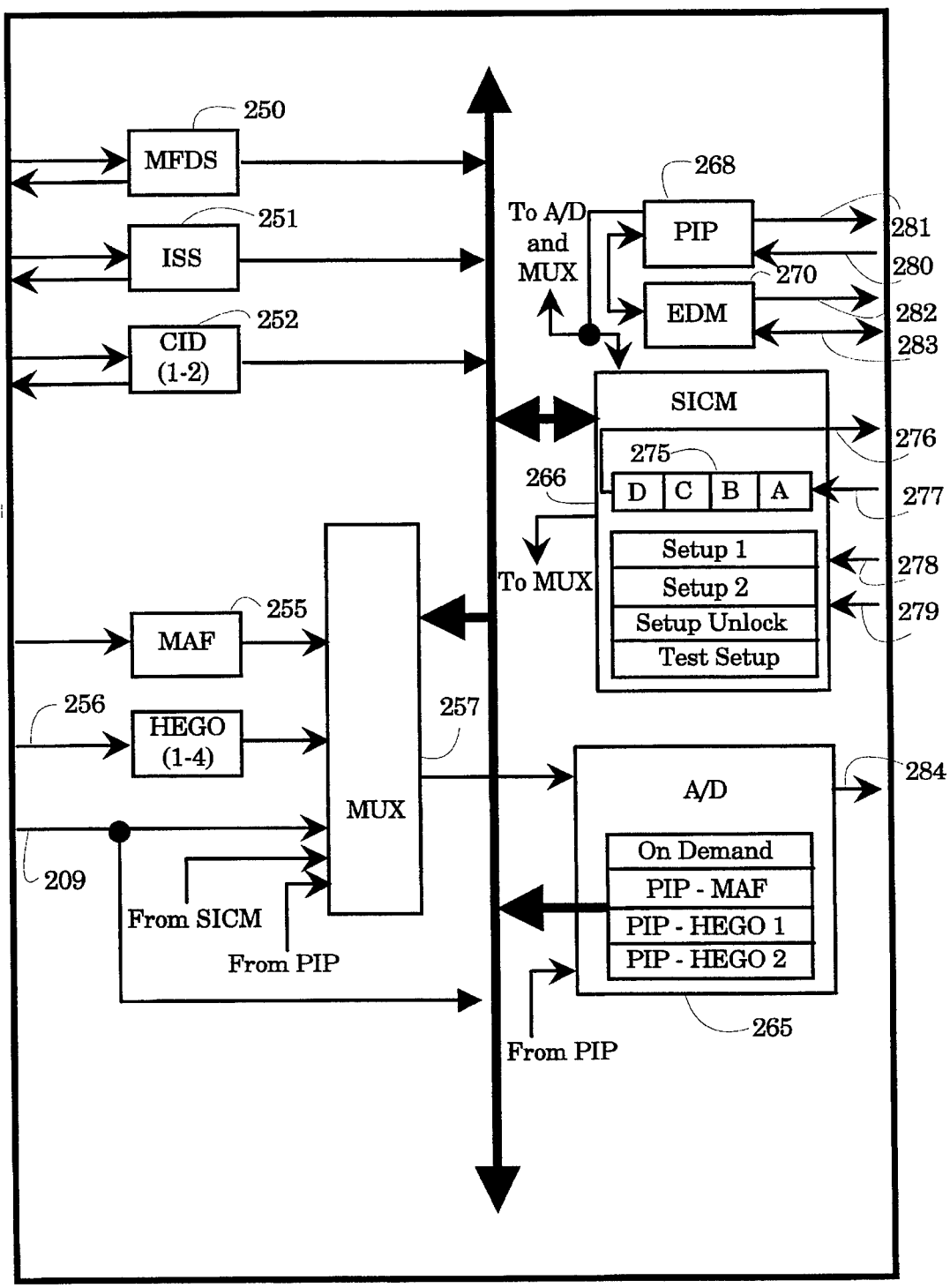
FIG. 2 of the drawings shows a block diagram of a preferred embodiment of an A/D converter chip (AICE)

FIG. 2 of the drawings shows a block diagram of AICE chip 15. AICE chip 15 receives analog input signals from engine 100 via a plurality of specialized input signal conditioning modules 250, 251, 252, 255 and 256, and eight general analog input lines 209. Analog input signals conditioned by modules 255 and 256 are transmitted to an A/D module 265 via multiplexer 257 which operates under control of input selection signals generated by serial interface control module (SICM) 266 to select an input signal as an input to the A/D module 265. A/D module 265 peforms an A/D conversion on the received signal and stores the resulting digital value in one of four A/D module registers contained in the A/D module.

The A/D module includes an A/D converter which preferably takes the form of a single channel, ten bit converter which includes a 14 channel input multiplexer and four 10 bit result registers. One of the registers (hereafter referred to as the "on-demand register") contains an A/D result, which is transmitted to the CPU in response to a read or write command from the CPU. The other three registers, termed herein as "critical parameter registers" contain values generated upon each engine revolution. Of the three critical parameter registers, two of the registers, termed herein as HEGO registers, contain digital values indicative of the composition of the engine exhaust gas, and one register, termed herein as a MAF register, contains a digital value indicative of the air mass flow rate into the intake manifold of the engine.

The A/D converter advantageously off-loads the CPU and expands the number of A/D channels. The A/D converter is a successive approximation type, which uses capacitor arrays to define the five most significant bits and resistors for the five least significant bits.

In a preferred embodiment, the fourteen channels of the input multiplexer consist of four HEGO signals, each generated from a separate HEGO sensor such as shown in FIG. 1 at 109, a MAF signal generated by MAF sensor 103, eight general input lines, and a test input.

The operation of the input signal conditioning modules 250–256 will now be described in further detail. MFDS 250, ISS 251 and CID 252 (collectively, the interface circuits) provide an interface to a signal produced by either a variable reluctance sensor or a Hall effect sensor and are preferably implemented using switched capacitor circuits. The interface circuits remove ground offset from an input signal, square the signal and buffer it. Programmable hysteresis is advantageously used to provide noise immunity when squaring the signal. CID module 252 preferably receives one or two cylinder identification signals, each of which is indicative of the firing of a first firing cylinder in a predetermined sequence of cylinder firing, and generates a digital signal for useable by the CPU. MFDS module 250 receives a misfire detection signal, which is indicative of a cylinder misfire, and generates a digital misfire signal for use by delta timer circuit (not shown) that measures pulsewidth of a PIP signal, to be described. ISS module 251 receives an intermediate shaft speed signal which is indicative of transmission shaft speed, and generates a digital intermediate shaft speed signal.

MAF module 255 conditions an analog signal produced by a MAF sensor 103 before conversion of the signal into a digital value by A/D converter 265. The MAF module is preferably implemented using switched capacitor circuits and removes ground offsets and filters the analog MAF signal via a two pole (33 Hz, 318 Hz) low pass filter.

HEGO module 256 conditions an analog signal produced by HEGO sensor 109 before conversion of the signal into a digital value by A/D converter 265. The HEGO module is preferably implemented using switched capacitor circuits and filters the analog HEGO signal via a programmable 10 Hz/160 Hz low pass filter.

As mentioned above, in addition to analog signals received by input signal conditioning modules 250–256, AICE 15 also contains eight general analog input lines 209. These lines may be connected to several different types of sensors, which provide absolute voltages.

PIP module 268 receives a profile ignition pickup (PIP) signal which is a digital signal generated by EDIS 12 in response to crankshaft position signal 115. A rising edge (transition) on the PIP signal preferably corresponds to a fixed engine position (typically 10 degrees before top dead center). EDM module 270 receives an EDIS diagnostic monitor (EDM) signal which is a pulse width modulated output of EDIS 12. The EDM signal is advantageously used to perform diagnostic operations on the EDIS 12. PIP module 268 and EDM module 270 preferably take an identical form.

The overall operation of AICE 15 is controlled by CPU 11 which transmits control signals to AICE 15 which are received by SICM 266 which implements the AICE chip's portion of the SLAP. SICM 266 includes four eight bit, parallel loading shift registers 275 for transmission of data between the AICE chip and CPU 11. Data transmission between the AICE chip and CPU 11 is controlled by a clock signal SCLK which provides clock signals to the AICE chip to synchronize timing of the AICE chip with the CPU. A latching signal SLTCH is generated by CPU 11 and controls the shifting of data through shift registers 275. SICM 266 also contains four registers, Setup 1 (6 bits), Setup 2 (1 bit), Setup Unlock (8 bits), and Test Setup (5 bits) for initialization and testing of the AICE.

Figure 3A:
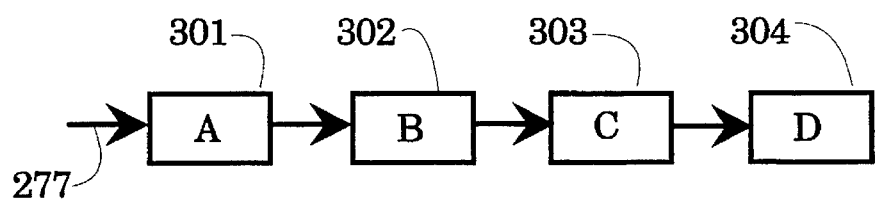
FIGS. 3(a), 3(b) and 3(c) show details of transmit and receive registers in the A/D converter chip.

FIG. 3(a) shows a receive format of registers 275 which is used when the SICM is in a receive mode in order to receive data from the CPU to the AICE. Data from the CPU is received over serial input 277 and shifted into registers 301, 302, 303 and 304, each of which comprises eight bits. Register 301 preferably contains control information, register 302 contains data, and register 303 contains three bits of data with the remaining five bits being unused. Register 304 is unused when the AICE is in a receive mode.

Figure 3B:
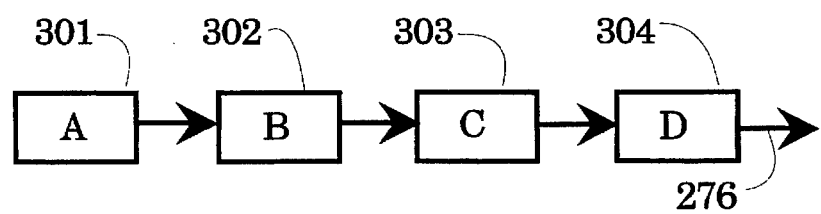

FIG. 3(b) shows a transmit format of registers 275 which is used when the SICM is in a transmit mode in order to transmit data from the AICE to the CPU. Register 301 preferably contains status information. Registers 302 and 303 together contain ten bits of data when an A/D result is being transmitted, with the eight most significant bits being stored in register 303 and the two least significant bits being stored in register 302, with the six remaining bits of register 302, and register 304 being unused. When Delta Timer Input (DTI) data (18 bits) is being transmitted, registers 302, 303 and two bits of register 304 are used with the remaining six bits of register 304 being unused. The data is shifted out of the registers and transmitted via serial output line 276. DTI data provides an indication of the pulsewidth of the PIP or misfire signals.

Figure 3C:
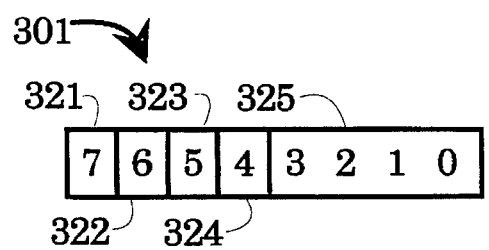

FIG. 3(c) of the drawings shows the organization of bits in register 301, which is used as a control register during receive mode and as a status register during transmit mode. During receive mode the bits in register 301 perform the following functions:

| Bit Number(s) | Function |
| --- | --- |
| 0–3 | Address bits. Contain an address channel number or an address of a control register. |
| 4 | Control Address Bit. A value of one indicates a control register command and a value of zero indicates an A/D command. |
| 5 | Write Bit. A value of one indicates a write (transmission of data from CPU to AICE), and a value of zero indicates a read (transmission of data from AICE to CPU). |
| 6 | IC Address Bit. A value of one indicates that the AICE chip is being addressed by the CPU, and a value of zero indicates that another chip is being addressed by the CPU. |
| 7 | Busy Bit. A value of one indicates that data in registers B, C and D is invalid, i.e. that the serial link is in transition, and a value of zero indicates that registers B, C and D contain valid data. |

During transmit mode the bits in register 301 perform the following functions:

| Bit Number(s) | Function |
| --- | --- |
| 0–3 | Address bits. Contain an address channel number or an address of a control register. |
| 4 | Control Address Bit. A value of one indicates a control register status and a value of zero indicates an A/D result. |
| 5 | A/D Extension Bit. A value of one indicates an A/D extension set, and and a value of zero indicates an A/D extension reset. |
| 6 | IC Address Bit. A value of one indicates that the AICE chip is being addressed by the CPU, and a value of zero indicates that another chip is being addressed by the CPU. |
| 7 | End of Conversion (EC)/PIP Bit. When functioning as an end-of-conversion bit, a value of one indicates that A/D conversion has completed and a value of zero indicates that A/D conversion is in progress. When returning a critical parameter value, a value of one indicates that the value is for the current PIP transition and a value of zero indicates that conversion of a value for the current PIP cycle has not yet completed and that the value being returned corresponds to the previous PIP cycle. If the AICE is returning DTI data, then a value of one indicates that PIP is high and a value of zero indicates that PIP is low. |

Figure 4A:
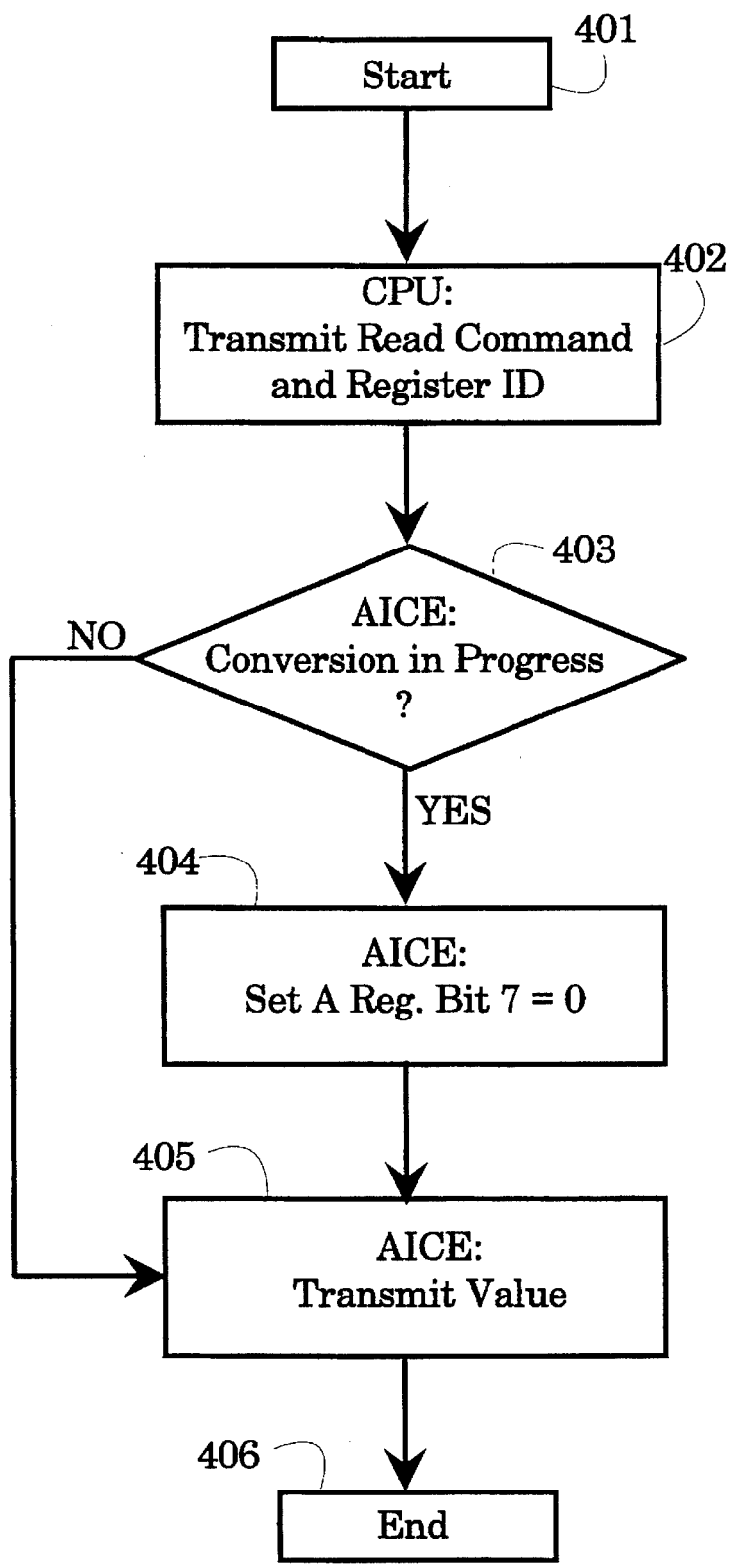
FIGS. 4(a), 4(b) and 4(c) show preferred communication protocols between the AICE chip and the CPU of FIG. 1.
Figure 4B:
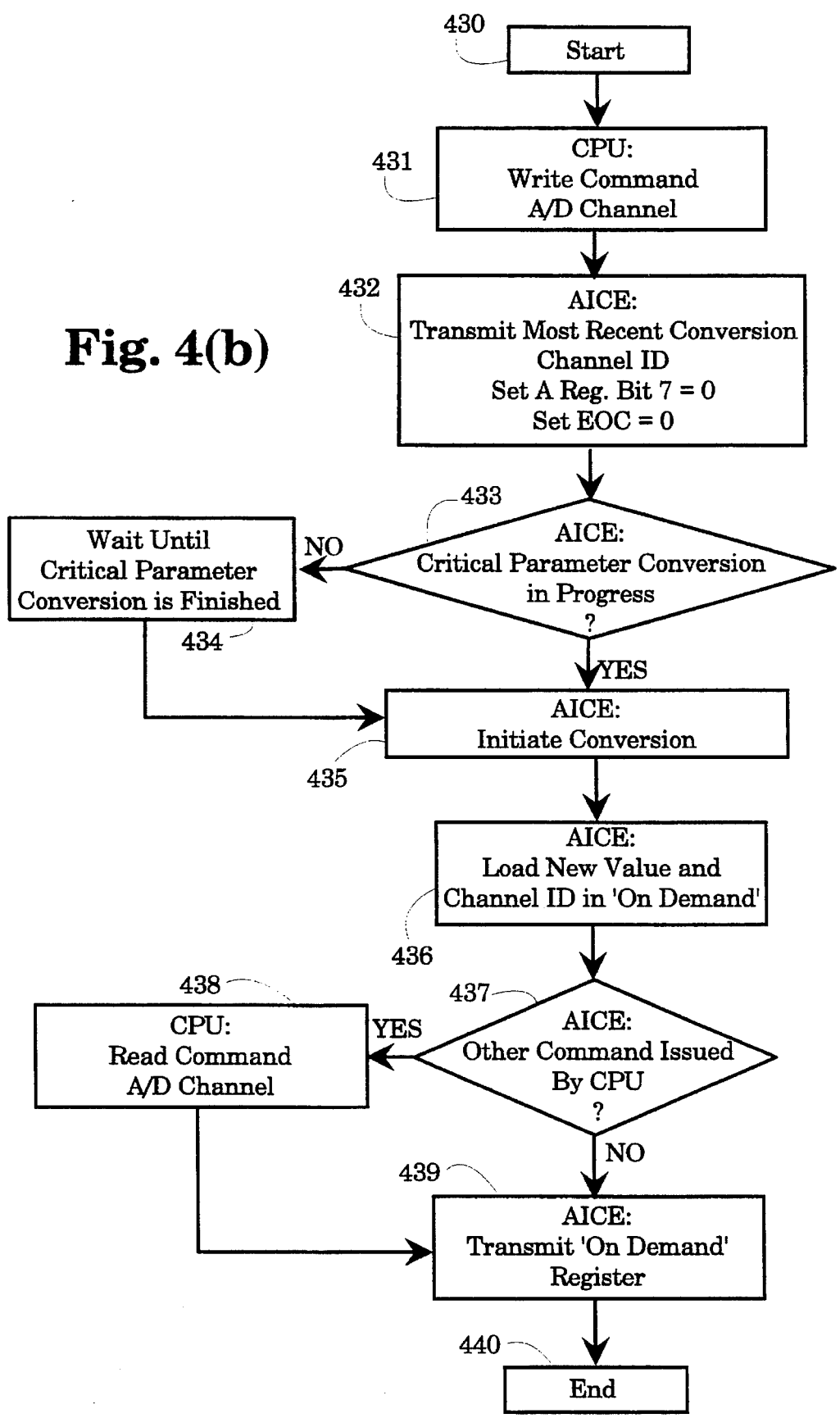
Figure 4C:
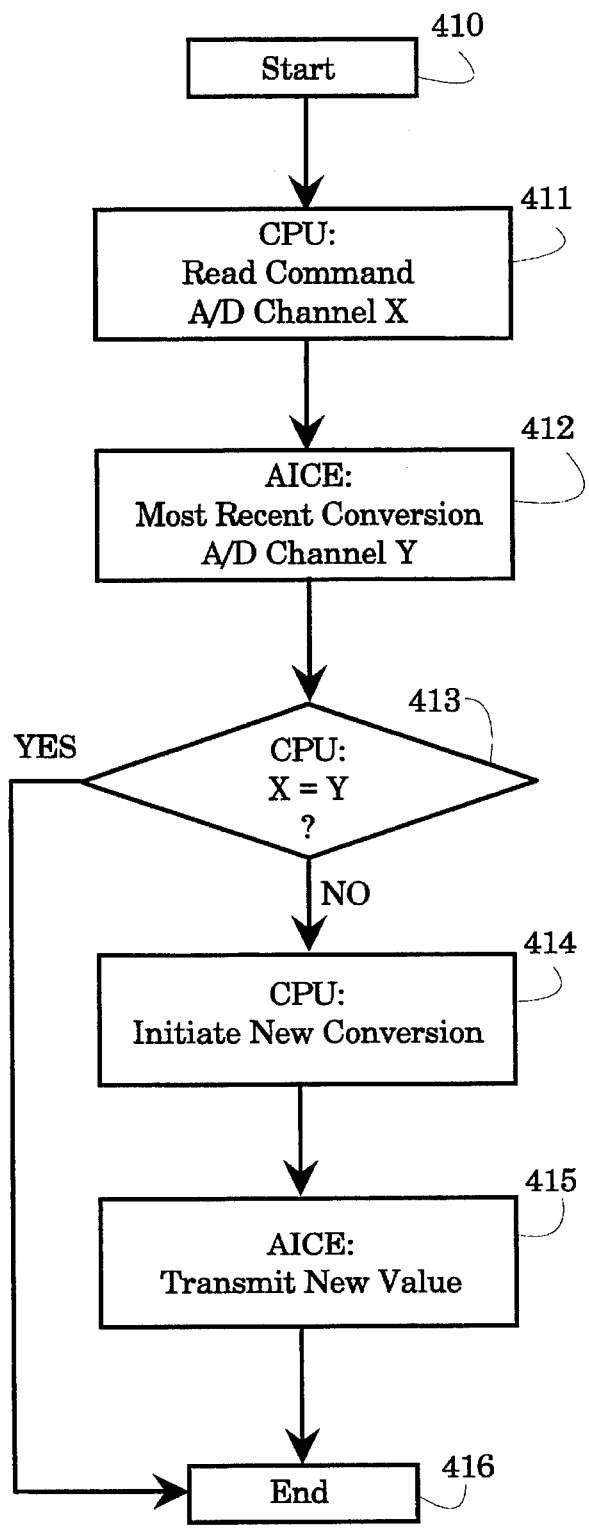

FIGS. 4(a), 4(b) and 4(c) of the drawings show the actions taken by the CPU and the AICE to implement two different data transfer protocols. FIG. 4(a) shows the steps taken to implement a critical parameter protocol in which values indicative of critical engine operational parameters are transmitted from the AICE to the CPU. FIG. 4(b) shows the steps taken to implement a link-initiated protocol in which the CPU requests a value other than one of the critical parameter values. FIG. 4(c) shows in greater detail, steps taken at step 438 of FIG. 4(b).

A preferred embodiment advantageously implements a prioritization scheme to prioritize conversion interrupts which may occur. First, a link initiated conversion will not interrupt a critical parameter conversion. The requested link initiated conversion will be performed after all three critical parameter conversions, MAF, HEGO-1 and HEGO-2 are complete. Second, a critical parameter conversion will not interrupt a link initiated conversion. The critical parameter conversions will begin after the link initiated conversion is complete. Third, a link initiated conversion will interrupt an unfinished link initiated conversion and the new conversion will start. If one link initiated conversion aborts a prior link initiated conversion, after a PIP transition has occurred, the critical parameter conversion sequence will execute before conversion of the new link requested conversion. This ensures that the critical parameter registers are updated on every PIP transition.

FIG. 4(a) shows the steps taken to implement a critical parameter protocol in which values indicative of critical engine operational parameters are transmitted from the AICE to the CPU. As explained above, the AICE generates two values, HEGO-1 and HEGO-2, which are indicative of the exhaust gas composition and one value, MAF, which is indicative of the mass air flow, upon each engine revolution. The critical parameter values are preferably generated in the following order: MAF, HEGO-1 and HEGO-2. The CPU requests one of these values at 402 by transmitting a read command together with the address of a critical parameter register. The requested value is transmitted immediately at 405. However, if a conversion of the requested value is in progress, as seen at 403, then at 404, bit 7 of the A register is set to a value of zero, to indicate that a conversion of the critical parameter values is in progress. The value presently contained in the critical parameter register, which is indicative of the value generated upon the prior engine cycle, is then transmitted to the CPU at 405. As can be seen from the foregoing description, a preferred embodiment advantageously provides the CPU with a desired critical parameter value without requiring the CPU to initiate the conversion, or causing the CPU to wait for conversion of the desired value from analog to digital form. If the value for the most recent engine cycle is not available, then the value from the prior engine cycle is transmitted and the CPU is informed of the transmission of the value from the prior engine cycle.

FIG. 4(b) shows the steps taken to implement the aforementioned link initiated conversion protocol, in which the CPU initiates the conversion of a desired value. The protocol is initiated at 430 and at 431, the CPU issues a write command together with an A/D channel identification. At 432, the AICE responds by transmitting the value contained in the on-demand register which is the most recent conversion, together with the channel identification of the value in the on-demand register. Also at 432, bit 7 of the status register is set to a value of zero and the on-demand, EOC bit is also set to a value of zero.

If at 433, a conversion of a critical parameter is not taking place, then at step 435, the AICE initiates the requested conversion. Otherwise, if at 433 a critical parameter conversion is in progress, then at 434, the AICE waits until the critical parameter conversion is finished, and then performs step 435.

At 436, the AICE loads the digital value, together with the channel identification of the convened value, into the on-demand register. At 437, the AICE determines whether a command subsequent to the command shown at 432 was issued by the CPU. If not, then at 439, the contents of the on demand register are transmitted to the CPU. If at 437, it is determined that the CPU issued an intervening command, then the CPU must issue a read command to request the value stored in the on-demand register. The protocol then terminates at step 440.

FIG. 4(c) of the drawings shows in greater detail, the steps performed at step 438. The protocol is initiated at 410 and at 411, the CPU issues a read command together with an A/D channel identification. This step was shown at 438 in FIG. 4(b). The AICE, at 412, responds by transmitting the value contained in the on-demand register, which is the most recently generated value, together with the channel identification of the value. The CPU responds at 413 by comparing the channel identification (Y) received from the CPU with the channel identification (X) transmitted to the CPU. If the two channel identifications match then the protocol terminates at 416. Otherwise, if the two channels identifications do not match, then at 414 the CPU initiates generation of a new value by the A/D converter by transmitting a write command. The AICE responds by generating and transmitting the requested value, and the protocol terminates at 416. It is possible that the CPU will have to perform the steps shown in FIGS. 4(b) and 4(c) several times in order to obtain a desired value if intervening interrupts keep occurring. Such intervening interrupts could occur if another task in the CPU requests a value from a different channel.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. An electronic engine controller comprising, in combination:

a primary control module which operates under stored program control to generate, as a function of a plurality of digital input variables each of which is indicative of an operating condition of the engine, a plurality of control signals to control at least a first operating parameter of the engine, said primary control module issuing a critical parameter request to receive a desired one of said digital input variables, which corresponds to an engine revolution in which said critical parameter request is issued; and an analog-to-digital (A/D) conversion means, responsive to a trigger signal which is generated at least once per engine revolution and to a plurality of input signals, each of said input signals being indicative of an operating condition of the engine, said A/D conversion means comprising, means for automatically generating a first of said digital input variables as a function of a first of said input signals upon each occurrence of said trigger signal, and for storing said first digital input variable, means responsive to said critical parameter request for transmitting the stored value of said first of said digital input variables, which corresponds to the value of said first of said digital input variables for an engine revolution prior to the engine revolution in which the critical parameter request is issued, if generation of said first digital input variable corresponding to the present engine revolution is incomplete, and means, responsive to said critical parameter request, for transmitting said first of said digital input variables corresponding to the engine revolution in which the critical parameter request is issued if generation of said first of said digital input variables corresponding to the engine revolution in which the critical parameter request is issued is complete.

2. An electronic engine controller as set forth in claim 1 wherein the A/D conversion means comprises a plurality of channels, each of which store at least one digital input variable corresponding to an input signal, and further comprises an on-demand register for storing the results of a first link initiated conversion, and wherein the primary control module further comprises means for requesting said first link initiated conversion by transmitting a read command and a channel number which specifies one of said plurality of channels from which a digital input variable is desired, said A/D conversion further comprising means for responding to said read command and to said channel number by transmitting the value contained in the on-demand register and initiating the requested conversion, and upon completion of the requested conversion, loading the convened value in the on-demand register and checking for the presence of a second link initiated conversion, which occurs subsequent to said first link initiated conversion, and if said second link initiated conversion has not been made, then transmitting the value contained in the on-demand register.

3. An electronic engine controller as set forth in claim 2 wherein said primary control module further comprises means for responding to the occurrence of said second link initiated conversion by transmitting a read command and said channel number and said A/D conversion means further comprises means for responding to said read command and said channel number by transmitting the value contained in the on-demand register together with the channel identification of said value, said primary control module further comprising means for comparing the channel number of the digital input variable transmitted by the A/D conversion means to the channel number transmitted by the primary control module, and for initiating an analog-to-digital conversion on the channel corresponding to the channel number transmitted by the primary control module if the channel number of the digital input variable transmitted by the A/D conversion means does not match the channel number transmitted by the primary control module.

4. An electronic engine controller as set forth in claim 3 wherein the primary control module and the A/D conversion means are coupled by a serial link which comprises:

a first signal line for transmission of data signals, serially, from the primary control module to the A/D conversion means;

a second signal line for transmission of data signals, serially, from the A/D conversion means to the primary control module;

a third signal line for transmission of control signals, serially, from the primary control module to the A/D conversion means; and a fourth signal line for transmission of clock signals, from the primary control module to the A/D conversion means.

5. An electronic engine controller as set forth in claim 4 wherein the input signals received by the A/D conversion means comprise:

an exhaust gas composition signal, generated by a corresponding sensor, which is indicative of the composition of exhaust gas generated by the engine, said exhaust gas composition signal corresponding to said first of said input signals;

an airflow signals, generated by a corresponding sensor, which is indicative of a rate of air flow through an intake manifold of said engine;

a cylinder identification signal which is indicative of the position of a first firing cylinder in a predetermined sequence of cylinder firing;

a vehicle speed signal which is indicative of the speed at which said vehicle is traveling; and a misfire detection signal which is indicative of a cylinder misfire.

6. An electronic engine controller as set forth in claim 2 wherein the A/D conversion means further comprises a means, responsive to a link initiated conversion request transmitted by said primary control module, for initiating conversion of a digital input variable and transmitting said digital input variable to said primary control module, and wherein the A/D conversion means further comprises a prioritization means which delays initiation of said link initiated conversion request until completion of a pending critical parameter request, which delays initiation of said critical parameter request until completion of a pending link initiated conversion request, and which interrupts an ongoing link initiated conversion request upon receipt of a new link initiated conversion request.

7. An electronic engine controller for controlling operation of an engine, comprising, in combination:

a microprocessor, operating under stored program control to generate control values, for controlling operation of said engine, as a function of a plurality of digital input values;

an input signal conditioning chip comprising, means for receiving a plurality of input operating parameter signals, each of said signals indicative of an engine operating parameter, said plurality of input signals comprising a first set of signals and a second set of signals;

means, responsive to an engine revolution signal, which occurs upon each revolution of said engine, for generating a first plurality of digital values, each digital value corresponding to a signal in said first set of signals and for storing each of said first plurality of digital values in a corresponding critical parameter register;

means, responsive to a conversion request by said microprocessor, for generating a second plurality of digital values, each digital value corresponding to a signal in said second set of signals and for storing each of said second plurality of digital values in an on-demand register; and prioritization means comprising means, responsive to said conversion request, for delaying initiation of said conversion request, if generation of said first plurality of digital values; is incomplete, until completion of generation of said first plurality of digital values;

means, responsive to said engine revolution signal, for delaying generation of said first plurality of digital values, if a conversion request by said microprocessor is incomplete, until completion of said conversion request; and means, responsive to a first conversion request and to a subsequent conversion request, for halting conversion of a digital value corresponding to said first conversion request and for initiating conversion of a digital value corresponding to said second conversion request.

8. An electronic engine controller for controlling operation of an engine, comprising, in combination:

a microprocessor, operating under stored program control to generate control values, for controlling operation of said engine, as a function of a plurality of digital input values comprising a plurality of demand values, and a plurality of critical parameter values which include an exhaust gas composition value, indicative of the composition of exhaust gas generated by said engine, a mass air flow value indicative of the mass flow rate of air entering the engine;

an input signal conditioning chip comprising, means for receiving a plurality of input operating parameter signals, each of said signals indicative of an engine operating parameter, said plurality of input signals comprising a first set of signals and a second set of signals, said first set of signals including an exhaust gas sensor signal indicative of the composition of said exhaust gas, and a mass air flow signal indicative of said mass flow rate of air;

means, responsive to an engine revolution signal, which occurs upon each revolution of said engine, for generating said critical parameter values upon each revolution of said engine and for storing each of said critical parameter values in a corresponding critical parameter register;

means, responsive to a critical parameter request from said microprocessor, for retrieving each of said critical parameter values and for transmitting each of said critical parameter values to said microprocessor;

means, responsive to a conversion request from said microprocessor which requests generation of one of said on demand values, for initiating generation of said requested on demand value as a function of a signal from said second set of signals, and for storing said requested on demand value in an on demand register and for delaying generation of said requested on demand value if generation of one of said critical parameter values is incomplete and for initiating generation of said requested on demand value upon completion of generation of said critical parameter values;

means, responsive to said conversion request, and to a subsequent conversion request, which occurs during generation of an on demand value corresponding to said conversion request, for aborting generation of said on demand value corresponding to said conversion request and for initiating generation of an on demand value corresponding to said subsequent conversion request; and means, responsive to said conversion request and to the occurrence of said engine revolution signal subsequent to receipt of said conversion request, for delaying generation of said critical parameter values until completion of generation of the on demand value corresponding to said conversion request.

9. An electronic engine controller as set forth in claim 8 wherein the means for initiating generation of said requested on demand value further comprises:

means, responsive to a read command and a channel number which specifies one of said on demand values from said microprocessor, for initiating generation of said requested on demand value and for transmitting the contents of said on demand register to said microprocessor; and means, responsive to completion of generation of said requested on demand value, for storing said requested on demand value in said on demand register and for transmitting said requested on demand value to said microprocessor.

* * * * *